United States Patent [19]
Johnson

[11] Patent Number: 5,505,924
[45] Date of Patent: Apr. 9, 1996

[54] MULTISTAGE COUNTERCURRENT RECRYSTALLIZATION PROCESS AND APPARATUS FOR PERFORMING SAME

[75] Inventor: Neil M. Johnson, Chardon, Ohio

[73] Assignee: Bicron Corporation, Worcester, Mass.

[21] Appl. No.: 66,752

[22] Filed: May 25, 1993

Related U.S. Application Data

[62] Division of Ser. No. 646,354, Jan. 25, 1991, Pat. No. 5,240,467.

[51] Int. Cl.⁶ .................. C01D 3/16; B01D 9/00
[52] U.S. Cl. .................. 422/254; 422/245.1; 23/295 R; 23/296; 23/305 R
[58] Field of Search .................. 423/2, 249, 499; 23/295 R, 296, 305 T, 305 R; 422/245.1, 254; 156/621, 621 R

[56] References Cited

U.S. PATENT DOCUMENTS

| | | | |
|---|---|---|---|
| Re. 32,241 | 9/1986 | Saxer | 62/527 |
| 2,147,222 | 2/1939 | Treub | 87/12 |
| 2,204,180 | 6/1940 | Gerlach | 156/623 R |
| 2,562,325 | 7/1951 | Merritt | 156/621 |
| 2,593,300 | 4/1952 | Hachmuth | 260/666 |
| 2,757,126 | 7/1956 | Cahn | 196/18 |
| 2,910,516 | 10/1959 | Rush | 260/674 |
| 3,424,549 | 1/1969 | Godfrey | 23/305 |
| 3,902,855 | 9/1975 | Lynch | 23/295 R |
| 3,996,031 | 12/1976 | Chong | 23/296 |
| 4,544,391 | 10/1985 | Oka | 23/297 |
| 4,588,414 | 5/1986 | Takegami | 23/295 R |
| 4,666,456 | 5/1987 | Thjssen et al. | 23/296 |
| 4,885,016 | 12/1989 | Griffiths | 62/532 |
| 5,127,921 | 7/1992 | Griffiths | 23/295 R |

FOREIGN PATENT DOCUMENTS

| | | |
|---|---|---|
| 629417 | 9/1949 | United Kingdom . |
| 90-01978 | 3/1990 | WIPO . |

Primary Examiner—Gary P. Straub
Attorney, Agent, or Firm—Volker R. Ulbrich

[57] ABSTRACT

A multistage process for the separation and purification of a desired crystalline material by repeated dissolution and recrystallization, wherein crystals and solvent move countercurrent to one another through the stages. A fluid temperature gradient is maintained within each recrystallization unit to make use of convection to facilitate or accelerate concurrent dissolution and recrystallization within a single vessel. Solid recrystallized material is moved from one unit to the next unit. An automated apparatus and a manually operated apparatus for carrying out the process are also described.

8 Claims, 3 Drawing Sheets

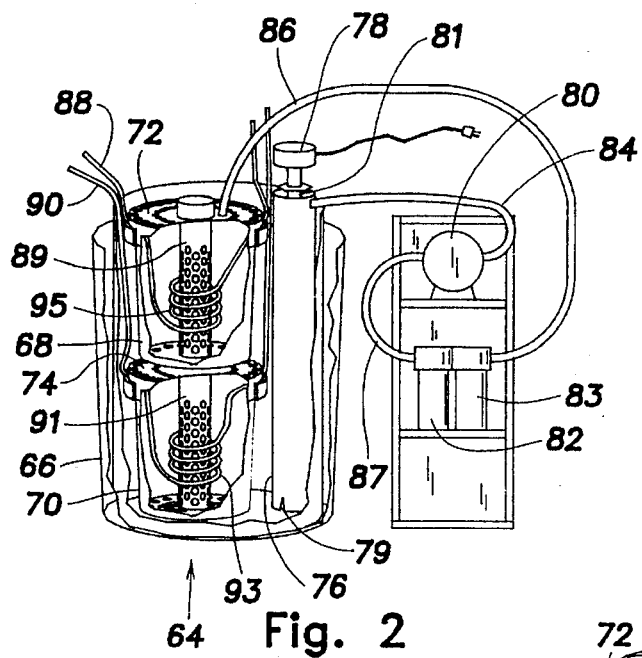
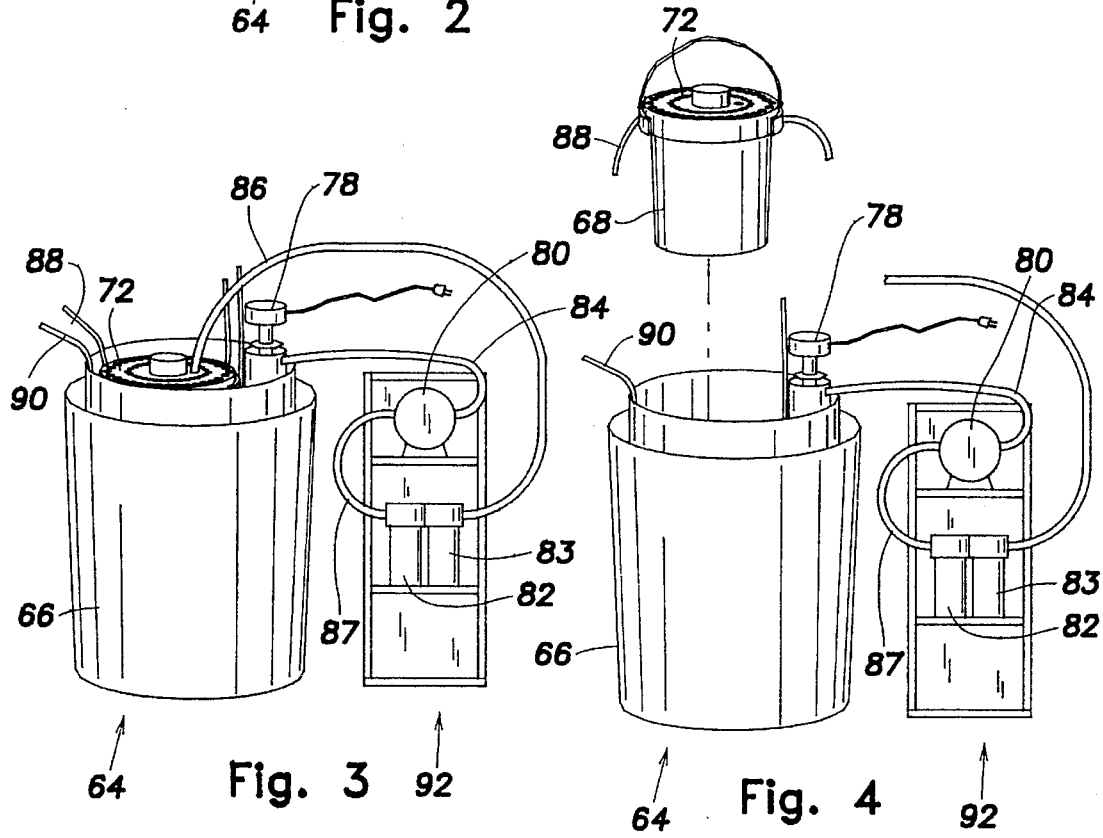

MULTISTAGE COUNTERCURRENT RECRYSTALLIZATION PROCESS AND APPARATUS FOR PERFORMING SAME

This is a divisional of application(s) Ser. No. 07/646,354, filed on Jan. 25, 1991, now U.S. Pat. No. 5,240,467.

BACKGROUND OF THE INVENTION

The present invention relates to a method for separating and purifying a desired crystalline substance from a solid mixture and for removing occluded impurities by repeated dissolution and recrystallization. It also relates to apparatus suitable for use in practicing the method.

Because of the structure of the lattice cell, crystallization theoretically offers the advantage over other separation processes of yielding a pure component in a single stage. In practice, however, it is generally not possible to obtain a pure component by a single crystallization because of occlusions of mother liquor. These occlusions, or small pockets of solution trapped within or between relatively large individual crystals, can be removed by redissolving the impure crystals in pure solvent. The pure solvent dilutes impurities from the occluded solution and, upon subsequent recrystallization, a higher degree of purity is achieved. Consequently, multiple crystallizations can provide any desired degree of purity, limited only by the purity of the solvent.

Most production crystallizers for commodity chemicals are large, expensive, automated devices which achieve supersaturation in continuous operation, either by cooling of hot concentrated solutions or by evaporation of solvent within the crystallizer. Prolonged suspension of growing crystals in agitated mother liquor effectively minimizes the number and extent of occlusions and provides some measure of particle size control. Attempts to stockpile crystal and mother liquor inventories of intermediate purity to achieve multistage countercurrent crystallization with a single unit become increasingly unattractive as the material value and the number of required crystallizations increase because of scheduling complexity, storage requirements, and carrying costs.

Both the evaporative and the cooling type commercial crystallizers require a substantial investment in energy in order to recover any crystals, and this cost penalty is multiplied by whatever number of recrystallizations are required for achieving the desired level of purity. Furthermore, addition of more water to redissolve purified crystals for succeeding crystallization steps multiplies the water purification cost and/or the contribution of soluble impurities in this water to the ultrapure crystals.

Daily feed batch and mother liquor sampling and very prompt analyses of these samples for impurities are generally required for control of product purity levels during operation of a continuous crystallizer. The results of the various analyses are considered during calculation of the minimum volume of mother liquor which must be purged from the crystallizer that day to ensure that the product will meet purity specifications during the next 24 hours. Larger purges result in a cleaner product, but at the cost of reduced material efficiency and/or the need to reprocess a greater amount of impure mother liquor material. Mother liquor purging also frequently results in large upsets in the crystal size distribution, which may lead to rejection of some product for reasons unrelated to its level of purity.

The demand for crystalline commodity chemicals is usually met with continuous crystallizers because of their low labor input and predictable behavior, but the purity level of the product is geared by simple economics toward the purity specifications of 90% of the market. Customers who may require more modest amounts of material with impurity concentrations which are lower by several orders of magnitude are usually forced to repurify the commodity material themselves or obtain it from a specialty manufacturer of fine chemicals. Continuous crystallizers are almost never used in these situations because of their prohibitive cost and the intermittent nature of the market. For these reasons the cost per pound of purified crystalline materials typically climbs very steeply as purity specifications are tightened and potential demand for higher purity grades is curtailed accordingly.

It is an object of the invention to provide a countercurrent multistage crystallization process for producing ultrapure crystalline compounds wherein dissolution and crystallization occur within each of a series of modular devices.

Another object of the invention is to provide inexpensive modules suitable for performing the process of the invention and which can be combined in series to achieve any desired degree of purity with only a modest increase in the amount of labor required.

Other objects and advantages of the invention will be apparent from the following description, drawings, and disclosure.

SUMMARY OF THE INVENTION

In accordance with the present invention, there is provided a process for separating the desired crystalline compound from a mixture of solid substances which comprises disposing a solid mixture into the first of a series of recrystallization units or apparatuses and solvent into the last unit in the series, moving solid material progressively from the first unit to the last unit, and moving solvent progressively from the last unit to the first unit to achieve multistage countercurrent recrystallization. The desired crystalline substance achieves progressively higher degrees of purity upon recrystallization at each successive stage, while the solvent has progressively higher concentrations of impurities as it moves from the last to the first recrystallization unit. The number of stages required depends on the desired purity and the properties of the crystalline material. At each stage in the process, crystals from the prior stage are dissolved in a heated or higher temperature section of a unit, while higher purity crystals are simultaneously recrystallized in another cooled or lower temperature section of the unit. The temperature of the high temperature region in each unit is preferably substantially the same, and the temperature of the low temperature region in each unit is preferably substantially the same. The process is accelerated by strategic positioning of the high-temperature dissolution section relative to the low-temperature recrystallization region to take advantage of natural convection. Because the process is dependent on differences in solubility as a function of temperature and does not rely on evaporation of solvent to achieve separation, the process is most efficient for purification of crystallizable compounds whose solubility varies significantly over the range of operating temperatures. Crystals having the desired purity are removed from the last unit on either an intermittent or continuous basis and solvent is removed from the first unit either intermittently or continuously.

The crystalline material to be purified by the present invention can include any salt or other crystalline material which is less soluble as the temperature of the solvent is decreased and whose saturated solution in solvent is more dense than the pure solvent. Such crystalline materials include inorganic salts such as CsI, CsCl, and NaI. The preferred solvent is water, although other solvents well known in the art can be used.

The present invention also provides an automated apparatus for continuous multistage recrystallization comprising individual modular units. Each unit has a vessel for containing a solvent capable of dissolving the desired crystalline substance, means for generating and maintaining a temperature profile or gradient within the solvent to induce recrystallization within a selected region of the vessel, and means for removing crystals from the vessel and conveying these crystals to the next unit.

The present invention also provides an apparatus for batch-continuous multistage recrystallization comprising individual modular units. Each unit has a vessel for containing a solvent capable of dissolving the desired crystalline substance, a first perforated container which can be suspended near the top of the vessel and is used for supporting crystals which are to be dissolved, a second perforated container positioned near the bottom of the vessel for collecting recrystallized material, and means for generating and maintaining a temperature profile or gradient within the solvent to induce dissolution of the crystals near the top of the vessel and to cause recrystallization near the bottom of the vessel.

The process of the invention has the advantage of providing a simple and efficient procedure for purifying a crystalline material to any desired purity level with a minimal amount of labor. The process also minimizes the need for frequent sampling and analysis of various impurities. The apparatus of the invention can generally be easily and inexpensively constructed from commercially available materials. The apparatuses have the additional advantage of being simple to operate, maintain and repair, and accordingly are of great value in industrial practice.

BRIEF DESCRIPTION OF THE DRAWINGS

FIG. 2 is a perspective view with portions cut away to reveal the internal components of a manual recrystallization apparatus which can be used in accordance with the process of the invention:

FIG. 3 is another perspective view of the manual recrystallization apparatus shown in FIG. 2 without portions cut away;

FIG. 4 is an exploded perspective view of the manual recrystallization apparatus shown in FIG. 3;

FIG. 6 is a graph showing the solubilities of various salts as a function of temperature.

DETAILED DESCRIPTION OF THE INVENTION

Figure 1:
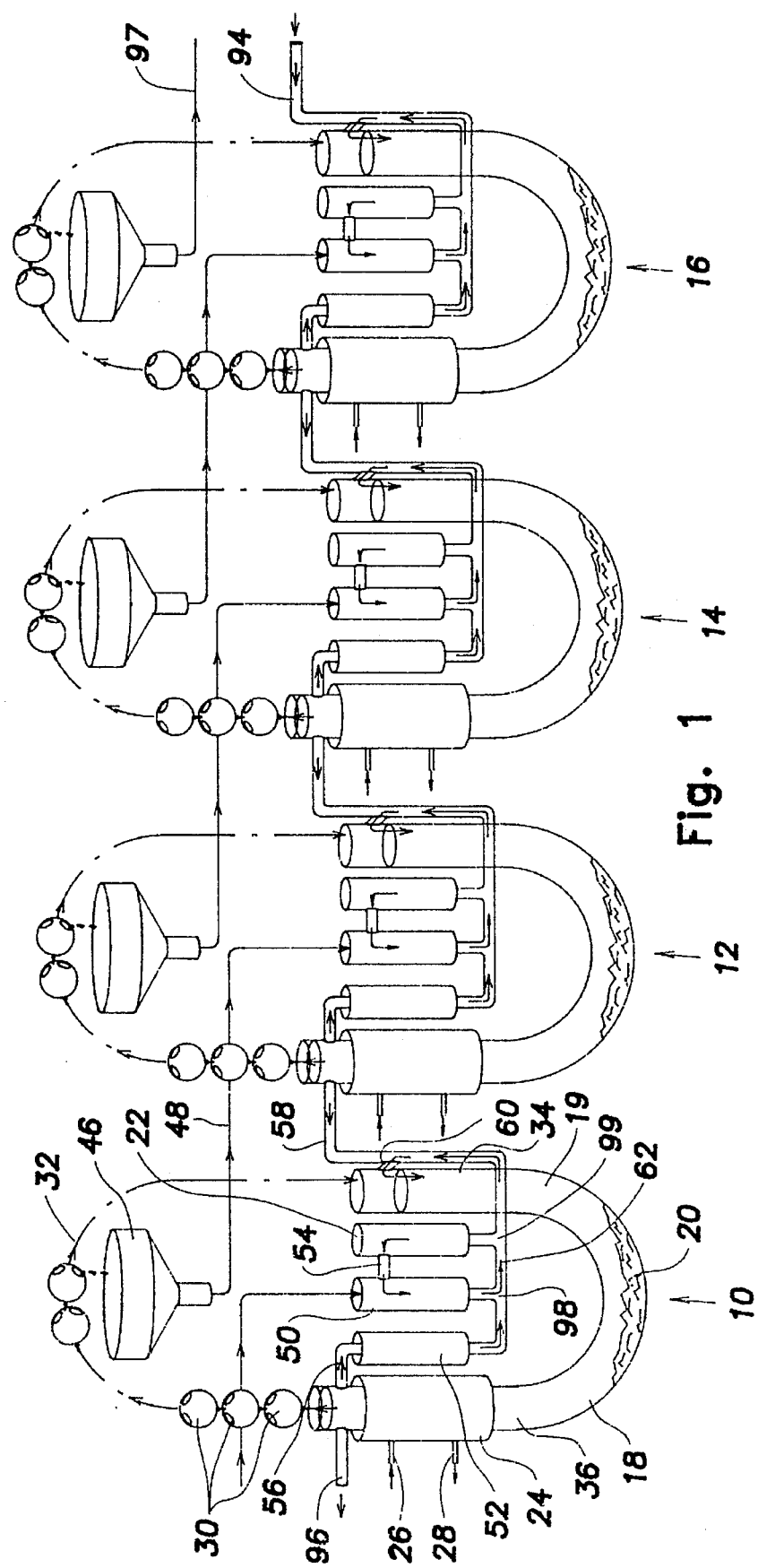
FIG. 1 is a schematic perspective of an automated recrystallization apparatus in accordance with the invention.

FIG. 1 illustrates an automated apparatus for purifying a crystalline material in accordance with the invention. The apparatus can include at least three individual recrystallization units 10, 12, 14, 16, depending on the properties of the material being purified and the desired degree of purity. Each individual unit comprises a U-shaped tubular vessel 18 capable of containing a non-hazardous solvent 19, such as water, in which the crystalline material is soluble. The units can be made of glass, molded thermoplastic parts, and/or metals which are unaffected by corrosion or chemical attack by ionic inorganic salts in aqueous solution. Recrystallized material 20 forms along the inside walls of the vessel and accumulates at the bottom of the vessel. In a preferred embodiment of the invention, a heating well 22 is used to heat solvent before it comes into contact with crystals that are to be dissolved in the dissolving well 50. Each unit is provided with a jacket-type chiller or heat exchanger 24 for removing heat from the solvent at the cooled or low temperature vertical leg 36 of the vessel. A chilled fluid such as water enters an inlet 26 of the chiller, absorbs heat from the solvent, and exits from an outlet 28 of the chiller. Perforated hollow spheres 30 are threaded on an endless loop of knotted rope 32 and drawn by a mating sprocket (not shown) down into a heated or high temperature vertical leg 34 of the U-shaped vessel and up out of the cooled vertical leg 36.

Perforations 38 on the sphere scrape growing crystals from the inner surface of the tubular vessel and into the interior of the sphere. Crystals are conveyed up out of the solution while solution drains from the crystals through a small orifice or orifices (not shown) in the sphere wall, along the rope and back into the cooled vertical leg. The maximum amount of solution is drained off the crystals.

A funnel-shaped receiver 46 is provided for collecting crystals which are dumped from the hollow spheres at the apex of the loop of hollow spheres. Conveying means 48 are provided for transporting recrystallized material formed in one unit to the dissolving well of the next unit. The conveying means could, for example, be chutes or mechanical conveyers. Each unit is provided with a filter 52 for removing accumulated particulate impurities such as polyanionic silicates, aluminares, borates, phosphates, arsenates, tungstates, and molybdates. Because many of the aforementioned polyanionic impurities tend to polymerize slowly in the neutral solution pH range where the units might be operated, it may be wise to withhold filtration from the first unit in which they are found in order to maximize the opportunity for the insoluble particles to grow to a size large enough to be filtered off easily.

For purposes of this description, solution, solvent and mother liquor may, depending on the circumstances, be used interchangeably. Solvent refers to a liquid capable of dissolving the crystalline material, mother liquor refers to the solution from which material recrystallizes, and either solvent or mother liquor may be referred to as solution.

Solution is circulated through each unit, in a manner to be described hereafter, by means of a recycle overflow 56, a solution manifold 62, a conduit 54, and a heated solution overflow 60. Solution is moved from one unit to a preceding unit of the process or out of the process from the first unit by means of a mother liquor overflow 58.

The solubility of most salts, such as CsI, KI, and NaI, increases at higher temperatures. Accordingly, most salts will preferentially crystallize in the cooled vertical leg of each unit, which will cause the salt concentration of solution contained within each cooled vertical leg to be lower than in the corresponding heated vertical leg. This concentration difference causes solution within the heated vertical leg to have a higher density than the solution within the cooled vertical leg, which results in the liquid level of the cooled vertical leg being higher than that of the heated vertical leg. For purposes of illustration, the differences in liquid level have been exaggerated in FIG. 1.

By reversing the temperature gradient in each unit, crystalline material which is more soluble as the temperature of the solvent is decreased can be purified.

Hot and cold operating temperatures of 40° C. and 20° C., respectively, can generally be used. If the automated apparatus is made of glass, metal, or appropriate plastic, it should be possible to operate at a hot temperature up to the boiling point of the solution and at a cold temperature down to the freezing point of the solution. Operation of the recrystallizing units at elevated temperatures and/or pressures may be desirable in selected cases.

A crystallizable material that is to be purified in accordance with the invention using the apparatus of FIG. 1 is introduced as a solid into the dissolving well 50 of the first unit 10, where the material is dissolved without the use of mechanical agitation. Raw material to be processed may be introduced either periodically or continuously. A small quantity of mother liquor periodically or continuously overflows from the cooled vertical leg 36 of each of the intermediate units 12, 14 via the mother liquor overflow 58 and enters the heated vertical leg 34 of the preceding unit at the heated solution overflow 60. At the last unit 16 a small quantity of high purity solvent enters the heated vertical leg through the fresh solvent inlet 94, while a similar quantity of mother liquor containing a high concentration of impurities exits the first unit 10 at the mother liquor outlet 96. The majority of mother liquor overflowing from the cooled vertical leg of each unit enters the filter 52 via the recycle overflow 56, passes through the filter to remove sparingly soluble particulate impurities, and enters the solution manifold 62. Manifolds 56 and 58 are positioned and/or valved to accommodate overflow and recycle flow rates which are appropriate for a given process.

Liquid flow through the manifolds, heating wells 22, and dissolving wells 50 is controlled by free convection. Heated solution passing down through the dissolving well of each unit dissolves crystals contained therein, and becomes saturated with the crystallizable material. The saturated solution has a higher density than the unsaturated mother liquor overflowing from the cooled vertical leg, and consequently flows downward through the dissolving well. The relatively cool unsaturated mother liquor overflowing from the cooled vertical leg and the warmer saturated solution from the dissolving well became intermixed at a first fluid junction 98. At a second fluid junction 99 the flow splits with a portion passing up the heating well 22, across a conduit 54 and back into the dissolving well to complete a convection driven looped flow, while another portion of the solution at fluid junction 99 rises up the manifold and passes into the heated vertical leg 34 via the heated solution overflow. The solution that overflows into the heated vertical leg is nearly saturated, whereas the solution at some intermediate point between the cooled vertical leg and the heated vertical leg becomes supersaturated, causing recrystallization. The colder solution in the cooled vertical leg, having been depleted of crystallizable material, has a lower density than the solution in the heated vertical leg, which causes solution to overflow from the cooled vertical leg into the manifold and ultimately back into the heated vertical leg.

Crystals formed in the last vessel 16 are of a higher purity than the raw crystals deposited in the dissolver 50 of the first unit 10. Crystals formed at each unit are scraped out of the vessel by the perforated hollow spheres 30, dumped into the funnel-shaped receiver, and conveyed to the dissolving well of the next unit. At each unit the crystals formed in the U-shaped tubular vessel are of a higher purity than the crystals which entered the dissolver. A high purity crystalline product exits the apparatus via the product chute 97.

Referring to FIG. 3, in accordance with another aspect of the invention each manually operated recrystallization unit in a batch-continuous multistage system has a recrystallization section 64 and a filtration section 92.

Referring to FIGS. 2 and 4, crystals are suspended in a perforated container 68, having a perforated lid 72 near the top of a vessel 66 capable of containing a solvent into which the crystals can be dissolved. An outer retaining vessel 75 is preferably provided to collect spillage and/or leakage from the apparatus. A second perforated container 70, having a perforated lid 74, is positioned near the bottom of the vessel. These various modules are made of thermoplastic molded parts (preferably, high molecular weight polyethylene or polypropylene) which are inert with respect to corrosion or chemical attack by ionic inorganic salts in aqueous solution. A heater 78 having a heating element 81 which extends a significant fraction of the full height of the vessel along a line parallel to the axis of the vessel is submerged within a cylindrical dip tube 76 which also extends along the full height of the vessel and is positioned near the inner wall of the vessel. Triangular notches 79 (only one is shown) are provided at the bottom of the dip tube to allow fluid communication between the vessel and the dip tube. Solution is drawn from the dip tube through a tube 84 to a pump 80, and is pumped through tubing 87 to a first filter 82 containing a carbon canister and through a second filter 83 containing a wound filter cartridge, and then into the upper perforated container 68 via tubing 86. Each perforated container 68, 70 is fitted with a perforated downflow pipe 89, 91 which extends vertically along the central axis of each of the containers. When both containers are properly positioned in the vessel and coupled, the two downflow pipes act as a single pipe having perforations within each of the containers.

Tubing 88, 90 is wound around the downflow pipe of each vessel, with each end of said tubing extending out of the vessel and provided with means for circulating a heating or cooling fluid through the tubing. The tubing is preferably made of plastic.

The containers 68, 70, vessel 66, and heating, cooling, and filtration accessories are constructed to facilitate easy assembly and disassembly of the component parts to permit removal of the containers as illustrated in FIG. 4.

The manual recrystallizer is operated by submerging an empty perforated container 70 with a perforated lid 74 into the bottom of the vessel 66. The crystalline material which is to be purified is deposited into another perforated container 68 and a perforated lid 72 is fitted onto the container 68. The perforated container 68 is then lowered into the vessel 66 and positioned above the empty container 70. The solvent solution level should be high enough to completely immerse the crystals in the container 68. A heated fluid is pumped through the heating coils 95 of the upper container holding the crystals to cause the temperature of the solution in the upper portion of the vessel 66 to rise relative to the temperature in the lower portion of the vessel. This temperature difference is further enhanced by circulating a chilled fluid through the coiled tubing 90, 93 of the lower perforated container. The heated solution in the upper portion of the vessel causes the crystals in the upper perforated container to dissolve without the aid of mechanical agitation. As the crystals dissolve, the heated solution becomes more dense than the solution in the lower portion of the vessel and sinks to the bottom of the vessel via the perforations in downflow pipe 89 and perforations in the bottom of the upper container and in the lid of the lower container. Hot and cold operating temperatures of 40° C. and 20° C., respectively, have been found satisfactory for recrystallizing CsI from aqueous solutions with plastic equipment of the type described.

Recrystallization occurs in the lower container near the cooling coils 93. During the process, sparingly soluble particulate impurities, such as Fe, Si, and Al, are removed from the solution by filtration. Solution enters the dip tube 76 through triangular notches 79 (only one of the notches is shown) and is pumped up through the dip tube, which has a heating element 81 running through it. The heater heats the solution by perhaps 10°–20° C. and prevents recrystallization from occurring in the pump 80 and the filters 82, 83. After being filtered, the heated solution is returned to the top of the vessel. During the process, free convection is taken advantage of to accelerate dissolution and recrystallization. Denser solution having a high concentration of the dissolved crystalline material flows downward along the axis of the vessel while the cooled solution near the bottom rises along the walls of the vessel.

Figure 5:
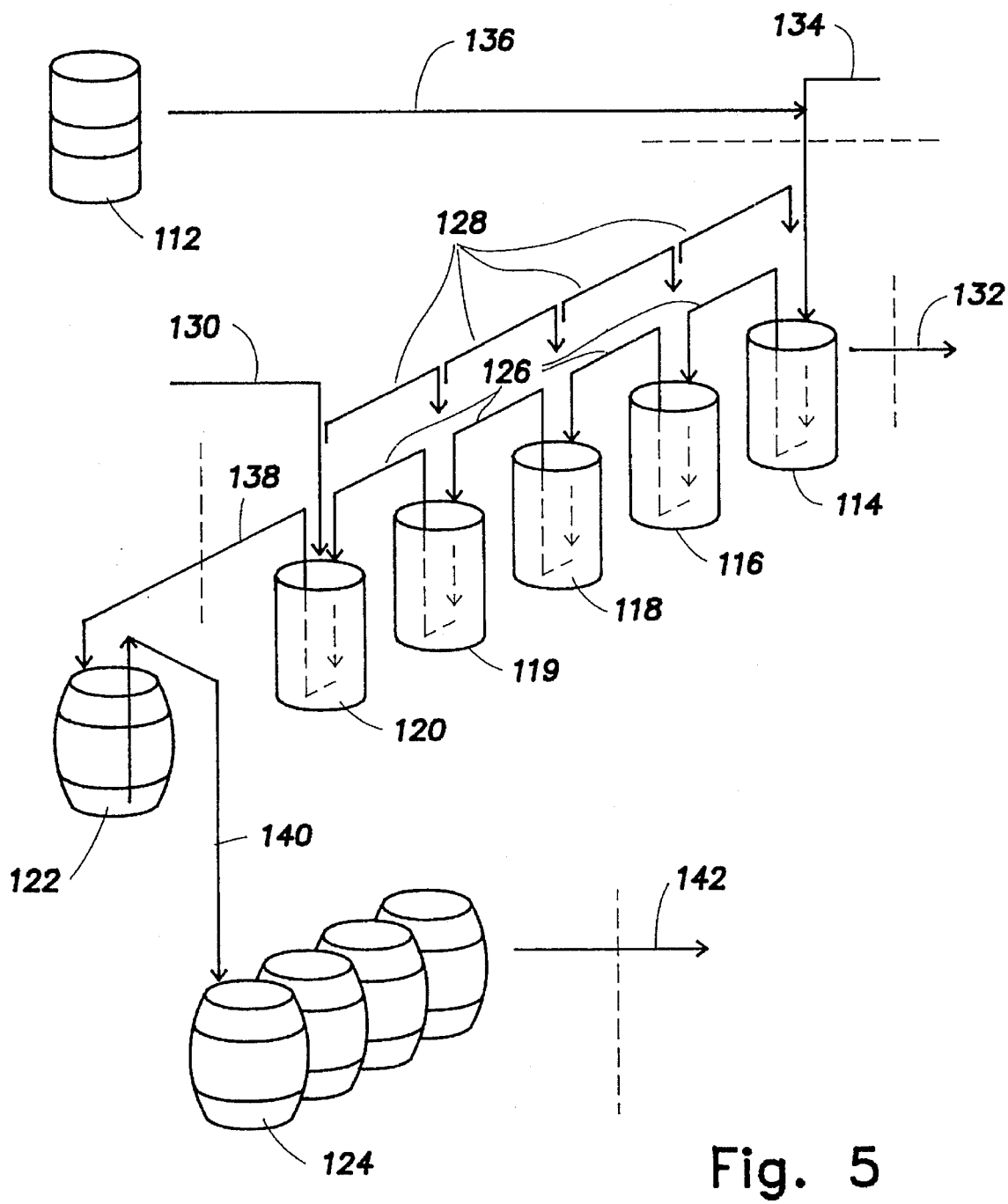
FIG. 5 is a schematic for illustrating how the manual recrystallization apparatus shown in FIG. 3 may be used in a multistage recrystallization process.

A series of manual recrystallizers may be operated in batch-continuous manner, with crystals and solvent moving countercurrently from vessel to vessel to achieve any desired degree of purity. A multistage process using five manual recrystallizers is illustrated in FIG. 5.

At each stage crystals, are dissolved in the upper containers 68 and recrystallized in the lower containers 70. At the conclusion of recrystallization, the containers are removed and solution is allowed to drain back into the vessel from which it came. A predetermined quantity of solution (perhaps 200–1000 ml) from the vessel of the first recrystallization unit 114 is removed from the process, as indicated by the path 132, to control the accumulation of impurities. A similar relatively small quantity of solution from each of the other recrystallization units 116, 118, 119, and 120 is transferred, as indicated by the paths 128, to each of the preceding units, with at least a portion (and generally all) of this solution being used to rinse the crystals which were removed from the recrystallization unit into which the solution is being transferred. By recycling mother liquor as crystal wash in a flow countercurrent to the stream of crystalline solid material, efficiencies approaching 100% can be achieved by allowing impurities to accumulate to very high levels in the mother liquor of the first crystallizer before recycling or discarding it. Fresh solvent is added to the last recrystallization unit 120, as indicated by the path 130, to replace solution transferred to the fourth unit 119. The time allowed for drainage of mother liquor from wet crystals, the volume of cleaner mother liquor used for washing, and the technique used for pouring it through the crystals all have an influence on the distribution of a given impurity in the mother liquor throughout the series of units. If a larger volume of wash water is needed to maintain an acceptable distribution of impurities, a larger volume of deionized double-distilled water must be added to the last unit and a comparable amount of mother liquor removed from the first unit.

Since the upper containers 68 and the lower container 70 are substantially identical and functionally interchangeable, their roles can be reversed. This eliminates any need to transfer recrystallized material from one container to another. Consequently, for the next dissolution-recrystallization cycle, the empty containers 68 are positioned at the bottom of each vessel. The bottom container holding the crystals formed in the first unit 114 is placed in the upper container position of the second unit 116. This transfer is indicated by the path 126. Likewise, the crystals from the other units are respectively placed in the upper container positions of the next unit. These transfers are indicated by the paths 126. The container holding the purified crystalline product formed in the last unit is drained and the contents thereof are transferred via path 138 to drum 122. Each container is marked to ensure that its use is restricted only to two adjacent vessels in order to minimize the opportunity for undissolved crystals or residual solution to contaminate the much cleaner material in units closer to the final purified product, The above steps are continually repeated to provide the desired countercurrent batch-continuous recrystallization process.

EXAMPLE

The purification of cesium iodide was carried out using the countercurrent batch-continuous manual process and apparatus described hereinabove. Deionized double-distilled water was used as the solvent. The cesium iodide to be purified originally contained approximately 30 to 1000 ppm of sodium. Product CsI with sodium at far less than 0.5 ppm and overall CsI purity between 99.999% and 99.9999% was achieved consistently when Na concentrations in units 5, 4, 3, 2, and 1 were not permitted to exceed 3, 20, 130, 800, and 5,000 ppm, respectively. If any of these concentrations were reached during periodic sampling and analyses, mother liquor from the first (and dirtiest) unit was removed for reclamation (typically amounting to 5–10% of cumulative feed, depending on its purity); the other four mother liquors were diluted somewhat and filtered into the previous unit after it was emptied, and the last unit was filled with deionized, double-distilled water before operation was resumed.

Again referring to FIG. 5, polished cakes of cesium iodide, having a purity of 99.9%, were removed from a plastic-lined storage drum 112, broken into chunks, and transferred to the upper container of the first recrystallization unit 114 as indicated by the path 136. Alternatively, cesium iodide in any form suitable for depositing into the containers 68 and having a purity of 99.9% can be introduced into the process as indicated by the alternate path 134.

CsI is particularly suitable as the crystallizable material to be purified by the method of the present invention. One reason for this is that CsI has a relatively steep solubility curve, as shown in FIG. 6. That is, the solubility of CsI in water increases rapidly in the temperature range of interest (10°–70° C.). It is believed that the method of the present invention will work particularly well for any salt with a solubility curve as steep as, or steeper than, that of CsI. If the solubility curve is steep, less heat and less change in solution temperature are needed to achieve an equivalent amount of recrystallization. The method of the present invention cannot be utilized, as a practical matter, with a crystallizable material, the solubility of which does not change appreciably with change in solvent temperature within the temperature range of interest. Such a material is NaCl, which, as shown in FIG. 6, does not appreciably change solubility between 0° C. and 100° C.

While the invention has been described in connection with what are presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A recrystallization apparatus for separating a crystallizable material from impurities, comprising:
   at least one vessel suitable for containing a solvent capable of dissolving said crystallizable material;
   a first container adapted for suspending said crystalline material near the top of said vessel, said first container having perforations;
   a second container adapted for collecting recrystallized material near the bottom of said vessel, said second container having perforations; and
   means associated with said vessel for maintaining the solvent near the top of said vessel at a higher temperature than that of the solvent near the bottom of said vessel.

2. The apparatus of claim 1, wherein said first container and said second container are interchangeable.

3. The apparatus of claim 2, wherein said first container and said second container are identical.

4. The apparatus of claim 3, wherein said vessel and said containers are made of materials resistant to corrosion from inorganic salts.

5. The apparatus of claim 1, wherein a perforated downflow pipe extends between said first and said second container.

6. A recrystallization apparatus for separating a crystallizable material from impurities, comprising:
   (a) a series of at least two interconnected vessels, each suitable for containing a solvent capable of dissolving said crystallizable material, each of said vessels having a low temperature region and a high temperature region, the solvent contained within said regions constituting a single continuous body of fluid;
   (b) means for maintaining the solvent in said high temperature region at a higher temperature than the solvent in said low temperature region;
   (c) container means for continuously removing solid recrystallized material from said low temperature region of each of said vessels;
   (d) means for transporting said removed solid crystalline material to the next vessel in the series; and
   (e) means for transferring solvent from each vessel to the preceding vessel in a direction countercurrent to the direction in which solid recrystallized material is transported.

7. The apparatus of claim 6, further comprising means associated with at least one of said vessels for filtering solid impurities from the solvent.

8. A recrystallization apparatus according to claim 6, wherein each of said vessels is U-shaped and tubular and has a high temperature vertical leg and a low temperature vertical leg, and wherein said means for removing solid recrystallized material comprises a plurality of containers arranged in an endless loop and drawn down into the high temperature vertical leg and up out of the low temperature vertical leg of said U-shaped tubular vessel, said containers having edges designed to scrape crystals from the inner surface of said U-shaped tubular vessel, said crystals being conveyed by said containers up out of the solvent, with solvent being allowed to drain away through an opening in the bottom of each of the containers sized to allow liquid to pass through but prevent passage of crystals.

* * * * *